(12) United States Patent
Kokemohr

(10) Patent No.: US 9,589,335 B2
(45) Date of Patent: Mar. 7, 2017

(54) METHOD FOR DYNAMIC RANGE EDITING

(71) Applicant: Google Inc., Mountain View, CA (US)

(72) Inventor: Nils Kokemohr, Hamburg (DE)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/051,731

(22) Filed: Feb. 24, 2016

(65) Prior Publication Data

US 2016/0171672 A1 Jun. 16, 2016

Related U.S. Application Data

(63) Continuation of application No. 14/270,313, filed on May 22, 2014, now Pat. No. 9,286,665, which is a
(Continued)

(51) Int. Cl.
*G06K 9/40* (2006.01)
*G06T 5/00* (2006.01)
(Continued)

(52) U.S. Cl.
CPC ............... *G06T 5/009* (2013.01); *G06K 9/36* (2013.01); *G06K 9/52* (2013.01); *G06T 2207/20208* (2013.01)

(58) Field of Classification Search
CPC . G06T 2207/10144; G06T 2207/10024; G06T 2207/20208; G06T 2207/10016; G06T 2207/20221; G06T 5/002; G06T 5/009; G06T 5/008; G06T 5/007; G06T 5/20; G06T 5/60; G06T 5/50; G06T 15/503;
(Continued)

(56) References Cited

U.S. PATENT DOCUMENTS

| 4,504,908 A | 3/1985 | Riederer |
| 5,155,588 A | 10/1992 | Levien |

(Continued)

FOREIGN PATENT DOCUMENTS

| EP | 0 886 437 | 12/1998 |
| JP | 7-162677 | 6/1995 |

(Continued)

OTHER PUBLICATIONS

Chiyo, Date et al., "Sentakuhanni-hen, Mac Fan Special 14", Mainichi Communications, Japan, Feb. 22, 2001, 51-70.
(Continued)

*Primary Examiner* — Ali Bayat
(74) *Attorney, Agent, or Firm* — IP Spring

(57) ABSTRACT

A method of displaying a high dynamic range image, comprising receiving the high dynamic range image, calculating a first set of tone mapping parameters as a function of the high dynamic range image, sub-sampling the first set of tone mapping parameters at a first resolution to create a first sub-sampled parameter set, creating a first tone-mapped image by processing the high dynamic range image as a function of the first sub-sampled parameter set, and displaying the first tone-mapped image. A method of compositing a plurality of versions of an image to create the high dynamic range image is also disclosed such that the compositing may be modified as a function of received user input.

17 Claims, 8 Drawing Sheets

Related U.S. Application Data continuation of application No. 13/739,754, filed on Jan. 11, 2013, now Pat. No. 8,737,764, which is a continuation of application No. 13/340,314, filed on Dec. 29, 2011, now Pat. No. 8,380,002, which is a continuation of application No. 11/944,380, filed on Nov. 21, 2007, now Pat. No. 8,111,941.

(60) Provisional application No. 60/867,080, filed on Nov. 22, 2006.

(51) Int. Cl.
*G06K 9/36* (2006.01)
*G06K 9/52* (2006.01)

(58) Field of Classification Search
CPC ........ G06T 9/00; H04N 5/2355; H04N 19/30; H04N 19/136; H04N 21/4318
USPC .......................................................... 382/274
See application file for complete search history.

(56) References Cited

U.S. PATENT DOCUMENTS

| | | | |
|---|---|---|---|
| 5,384,621 A | 1/1995 | Hatch et al. | |
| 5,638,496 A | 6/1997 | Sato | |
| 5,784,046 A | 7/1998 | Cahill | |
| 6,535,301 B1 | 3/2003 | Kuwata et al. | |
| 6,873,442 B1 | 3/2005 | Gindele et al. | |
| 7,023,580 B2 | 4/2006 | Zhang | |
| 7,027,054 B1 | 4/2006 | Cheiky et al. | |
| 7,034,880 B1 | 4/2006 | Endsley et al. | |
| 7,038,185 B1* | 5/2006 | Tumblin | H04N 5/2355 250/208.1 |
| 7,130,067 B1 | 10/2006 | Shibasaki et al. | |
| 7,227,573 B2 | 6/2007 | Stavely | |
| 7,308,139 B2 | 12/2007 | Wentland et al. | |
| 7,426,312 B2 | 9/2008 | Dance et al. | |
| 7,453,498 B2 | 11/2008 | Prentice et al. | |
| 7,592,996 B2 | 9/2009 | Brown Elliott et al. | |
| 7,602,529 B2 | 10/2009 | Foster et al. | |
| 7,636,485 B2 | 12/2009 | Simon et al. | |
| 7,853,833 B1 | 12/2010 | Gharbia et al. | |
| 7,953,287 B2* | 5/2011 | Drimbarean | G03B 13/18 382/254 |
| 7,983,508 B2 | 7/2011 | Guan | |
| 8,014,034 B2* | 9/2011 | Hooper | G06T 5/20 358/1.9 |
| 8,131,051 B2 | 3/2012 | Heath et al. | |
| 8,208,689 B2 | 6/2012 | Savolainen et al. | |
| 8,379,934 B2 | 2/2013 | Jasinski et al. | |
| 8,428,308 B2 | 4/2013 | Jasinski et al. | |
| 8,542,900 B2 | 9/2013 | Tolkowsky et al. | |
| 8,577,169 B2 | 11/2013 | Andrus et al. | |
| 2002/0136459 A1* | 9/2002 | Imagawa | G06K 9/6202 382/218 |
| 2002/0170852 A1 | 11/2002 | Reinhardt | |
| 2002/0171852 A1 | 11/2002 | Zhang et al. | |
| 2002/0186224 A1* | 12/2002 | Debevec | G06T 11/001 345/589 |
| 2005/0030315 A1* | 2/2005 | Cohen | G06T 15/503 345/538 |
| 2005/0104900 A1* | 5/2005 | Toyama | G06T 5/007 345/629 |
| 2007/0014470 A1 | 1/2007 | Sloan | |
| 2007/0025720 A1* | 2/2007 | Raskar | G03B 7/16 396/213 |

FOREIGN PATENT DOCUMENTS

| | | |
|---|---|---|
| JP | 10-091761 | 4/1998 |
| JP | 11-146219 | 5/1999 |
| JP | 2000-151985 | 5/2000 |
| JP | 2001-67469 | 3/2001 |
| WO | 2005104035 | 11/2005 |

OTHER PUBLICATIONS

KIPO, "International Search Report for International Patent Application No. PCT/US2007/085455", Mar. 18, 2008, 2.

KIPO, "Written Opinion for International Patent Application No. PCT/US2007/085455", Mar. 18, 2008, 4.

* cited by examiner 7.1

7.2

7.3

7.4

7.5

7.6

9.1

9.2

9.3

METHOD FOR DYNAMIC RANGE EDITING

CROSS-REFERENCE TO RELATED APPLICATION

The present application is a continuation of U.S. patent application Ser. No. 14/270,313, filed May 5, 2014, entitled "Method for Dynamic Range Editing" by Nils Kokemohr which is a continuation of U.S. patent application Ser. No. 13/739,754, filed on Jan. 11, 2013, entitled "Method for Dynamic Range Editing" by Nils Kokewhich which is a continuation of U.S. patent application Ser. No. 13/340,314, filed on Dec. 29, 2011, entitled "Method for Dynamic Range Editing" by Nils Kokemohr which is a continuation of U.S. patent application Ser. No. 11/944,380, filed on Nov. 21, 2007, entitled "Method for Dynamic Range Editing" by Nils Kokemohr which claims priority to U.S. Provisional Patent Application No. 60/867,080, filed on Nov. 22, 2006, entitled "Dynamic Range Editing" by Nils Kokemohr, which applications are incorporated by reference herein.

BACKGROUND

At the current time, the term "HDR imaging" is used for photography-based 3D rendering and for capturing HDR 32 bit images. We will here only focus on the latter. Such HDR-32 bit (sometimes 16 bit) images are created using a tripod and a camera that is operated in "bracketing" mode, so that a series of 2 to 15 images of different exposures is recorded. These images are merged in memory to one single 32 bit image, which then has a very high dynamic range. However, such a 32 bit image can not be displayed conveniently on any monitor or printer (yet). Therefore, a so-called "tone mapping" function is required to convert 32 bit images into an adapted, displayable 8 bit or 16 bit file.

Some of such tone mappings are given in Michael Ashikhmin, "A Tone Mapping Algorithm for High Contrast Images," in 13*th Eurographics Workshop on Rendering*. Eurographics, 2002, [Ash02]; Gregory Ward Larson, Holy Rushmeier, Christine Piatko, "A visibility matching tone reproduction operator for high dynamic range scenes," in *IEEE Transactions on Visualization and Computer Graphics*, 1997 [Ward97]; Erik Reinhard, Michael Stark, Peter Shirley, James Ferwerda, "Photographic Tone Reproduction for Digital Images," in Proceedings of ACM SIGGRAPH 2002, Computer Graphics Proceedings, Annual Conference Series. ACM Press/ACM SIGGRAPH, July 2002 [Rein02]. It should be said that the over two decades old "retinex" routine can also be considered the "mother" of all tone mappings (although not specifically designed for HDR imaging), which can be represented in simplified form as:

$$J=qI/(I*g)$$

where g is a convolution kernel function, such as a Gaussian bell curve, q is any factor such as 128.0, and "*" represents 2D signal convolution. In other words: $J_{xy}$ is bright if $I_{xy}$ is bright compared to the adjacent pixels within an area of influence defined by g.

This tone-mapping is currently at the state of the art poorly integrated into the workflow. What is needed is a method to enhance the HDR workflow, enhance the speed and ease of tone mapping, while enhancing the results and the convenience of editing for the user. Preferably, this would allow for fast previews of tone-maps, and allow editing of the image before the tone-map is applied. The invention disclosed herein will be called "DRE", which stands for Dynamic Range Editing.

SUMMARY

Disclosed is a method to process a tone-compressed image out of original data with a high dynamic range, intermediate data representing parameters for an image conversion, and user data, where said intermediate data are calculated at a low resolution.

Intermediate data may be first calculated at a low resolution in order to display a first resulting image on the screen, and then said intermediate data is processed at a second, finer resolution for refining the quality of the resulting image on the screen.

Also disclosed is a method to edit HDR data, where the user can provide selective input targeting a region in an image, comprising displaying a tone-mapped image on the screen, allowing the user to provide his desires for local changes of the tone mapping, and updating the tone-mapped image on the screen. The data may represent the desires of the user of local changes of tone mapping refined as a function of the original high dynamic range data.

Also disclosed is a method for tone-mapping, comprising keeping the HDR data in memory, keeping user input data in memory, keeping matrices resulting of the HDR data and the user input in memory, processing the HDR data and the matrices to obtain a tone-mapped image, and displaying the tone-mapped image on the screen. The HDR data and user input data can be stored to a hard drive.

Also disclosed is a method to process a tone-mapped image out of a series of differently exposed images, where different weights are assigned to each pixel in each image within the series, where high weights represent how well the pixel data is suitable to contribute to the resulting image, and a user interface is embedded, allowing a user to assign high weights to desired details of individual images within the series, and allowing a user to assign low or zero weights to undesired details of individual images within the series.

Also disclosed is a method to process a tone-mapped image out of a series of differently exposed and potentially unaligned images, comprising an image registration process applied to the series of images to align the images, where weights are used for an image response function calculation, so that an area of pixels can be used to calculate a final result that is larger than the area where all images are overlaid.

A method of displaying a high dynamic range image is disclosed comprising receiving the high dynamic range image; calculating a first set of tone mapping parameters as a function of the high dynamic range image; sub-sampling the first set of tone mapping parameters at a first resolution to create a first sub-sampled parameter set; creating a first tone-mapped image by processing the high dynamic range image as a function of the first sub-sampled parameter set; and displaying the first tone-mapped image.

In a further embodiment, after the display of the first tone-mapped image, sub-sampling of the first set of tone mapping parameters is done at a second resolution to create a second sub-sampled parameter set, a second tone-mapped image is created by processing the high dynamic range image as a function of the second sub-sampled parameter set, and the second tone-mapped image is displayed. This may be repeated.

Prior to the sub-sampling step, a second set of tone mapping parameters may be received from a user, and the sub-sampling step then comprises sub-sampling both the first and second sets of tone mapping parameters at the first resolution to create the first sub-sampled parameter set.

The second set of parameters may be, e.g., a region selection, brush stroke information, image reference points, image reference regions, color temperature adjustments or local brightness change information.

The first set of parameters may be, e.g., a matrix of convolution radii, or an adaptation light intensity matrix. The first set of parameters may correspond to a sub-set of the high dynamic range image.

A method of compositing and display of a plurality of versions of an image is disclosed comprising receiving the plurality of versions of the image; registering the plurality of versions; compositing the registered plurality of versions to create a high dynamic image; displaying the high dynamic image (including using the steps disclosed herein for such display); and providing a user interface to receive user input such that the compositing of the registered plurality of versions may be modified as a function of the received user input. The user input might be, e.g., selection of detail from one or more of the plurality of versions, or an assignment of weighting factors. The compositing step may comprise padding of one or more of the registered plurality of versions.

BRIEF DESCRIPTION OF THE DRAWINGS

FIG. 3.1 represents a matrix I containing unmapped HDR data. FIG. 3.2 shows an image J derived from I using a routine where a full resolution matrix P was used. FIG. 3.3 shows an image J derived from I using a routine of the invention, where P was sub-sampled to a very low resolution. FIG. 3.4 shows an image J derived from I using a routine where all matrixes J, P, and I were kept at a low resolution.

FIG. 7.1 represents a (un-mapped) HDR image, id est where no details were adapted to the dynamic range of a computer screen or printer. FIG. 7.2 shows an image as it could result from an HDR tone mapping process, and FIG. 7.3 shows such a tone-mapped image where the user has taken some selective control over the tone mapping process. FIG. 7.4 represents two matrices as they may occur in C, FIG. 7.5 may represent the matrix U, and FIG. 7.6 may represent the matrix P. The user input is represented in matrix U, FIG. 7.5, which has influenced the matrix P, shown in FIG. 7.6.

DETAILED DESCRIPTION

Figure 1:
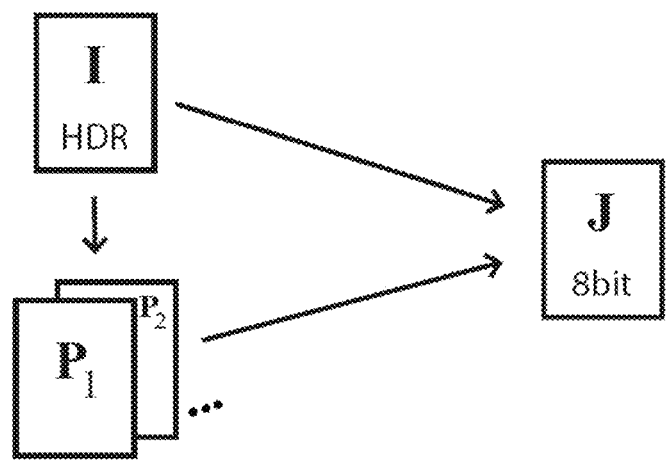
FIG. 1 is a diagram which shows the relation of the matrixes I, P, J representing original data with a high dynamic range, intermediate data representing parameters for an image conversion, and a final tone mapped image.

Tone Mapping is a process of taking a HDR image with a high dynamic range and with typically 16 bit or 32 bit, and converting such an image into an image that has contrast that was optimally adjusted for the screen or for a printer. The simplest class is called monotonic tone mapping, defined as $$J_{xy}=t(I_{xy})$$ [Equation 01]

In Equation 1, J is the tone mapped image, i.e., the image the contrast of which as adjusted for screen or print, I is the original HDR image, and t is a function that is strictly monotonic increasing. This means that if pixel $J_{am}$ is darker than pixel $I_{c}y$ in the contrast adjusted image, the piece of surface in the original scenario corresponding to (x,y) was also darker than the piece of surface corresponding to (x', y'). Hence, the name monotonic.

A preferred class of tone mapping functions, called adaptive tone mappings, is $$J_{xy}=t(I,x,y)$$ [equation 02]

As it can be seen, t is dependent from I and the current location, so that the contrast change of a pixel can be dependent on the surrounding image structure. This is done to lighten up structures in dark areas more than structures in bright areas. Imagine a person photographed against a bright sky, then all pixels in the face in I will be darker than most pixels in the sky in I. However, if t is adaptive, some pixels in the face in J may be brighter than some pixels in the sky in J. This enables better viewing. However, local contrast should be kept, so that $J_{xy}>J_{x'y'}\rightarrow I_{xy}>I_{x'y'}$ if (x,y) is spatially close to (x', y'). This condition is called "locally monotonic mapping", and while this condition may be violated in a small percentage of pixels in an image, it is an important condition to ensure that the resulting image contains meaningful details.

General Form of Tone Mapping

A general equation for tone mapping can be given as $$J_{xy}=t(I,x,y,P_{xy1},P_{xy2},\ldots P_{xyN})$$ [Equation 03]

$P_{te}$, are N different local parameters. For instance, Ashikmin suggests a tone mapping that is based upon a kernel of variable size, where the size of the kernel is based upon the local image contrast (parameter "s" in [Ash02]). This can be written as:

$$J_{xy}=t(I,x,y,s_{xy})$$ [equation 04]

where s is the radius of the convolution kernel used at the location x, y.

Alternatively, this can be written as:

$$J_{xy}=t(I,x,y,P_{xy})$$ [equation 05]

where P is a matrix that resulted in convolving I with a variable radius. Note that [Ahs02] processes P not by processing different convolution radii for every pixel, but by blending differently convolved images into one another based on a local parameter, which results in the same effect.

There is a major difference between Equations 04 and 05: To compute t $(I,x,y,s_{xy})$ with given parameters, a kernel needs to be convolved with I at every location (x,y), but computing $J_{xy}=t(I,x,y,P_{xy})$ where the matrix P is provided as an input parameter, will require much less computing power, once P is given. This is an important observation, since tone mapping is a computational time-intense process.

In the following sections we will disclose how to enhance the process of converting a matrix I of HDR data into an enhanced resulting image J. In the following sections we'll introduce some general forms of the algorithms first for a better understanding, and then fill in additional variations later and point out where the advantages of the suggested algorithms lie.

Equation 05 would translate into the following algorithm:

```
                                                      [routine 01]
10    Receive HDR image I, so that min(I) = 0.0 and max(I) = 1.0
20    Reserve some memory for P1, P2, . . .
30    Calculate P1, P2, . . . based on data in I
40    set J = t(I, P1, P2, . . . )
```

Approaching a HDR conversion in this sense provides an attack point for an acceleration. As said earlier, computing P out of I (for instance by applying a convolution kernel on I, or a local contrast detection on I) may be computing intense and calculating J in line 40 may be a lot faster, depending on the actual HDR conversion.

One way of accelerating the procedure is to calculate P (when we say P we mean $P_1$, $P_2$, $P_3$, . . . ) at a lower resolution, e.g., sub-sampling the P matrix. If I and J have dimensions of 1000×1000 pixels, P might be sub-sampled to a resolution of 100×100 pixels. Then the function t in line 40 would need to up-scale P to a size of 1000×1000 pixels for calculating J out of I and P. However, this is a non-time-consuming process, particularly if a nearest-neighbor interpolation is used.

Figure 2:
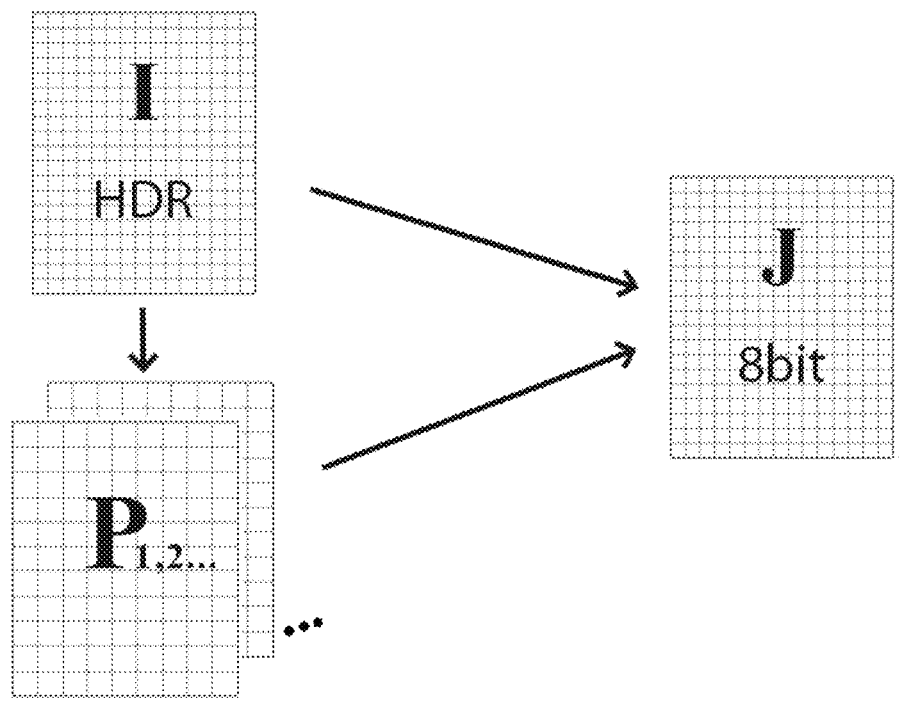
FIG. 2 shows the matrixes of FIG. 1, where a sub-sampled parameter matrix P is illustrated.

FIG. 1 shows the relation of the matrixes I, P, J mentioned in [routine 1] and [equation 5]. FIG. 2 shows the same matrixes where a lower resolution of P is illustrated.

Figure 3:
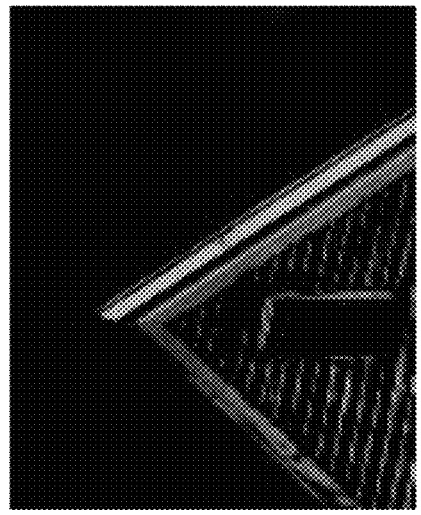
FIG. 3 comprises four images.
Figure 3:
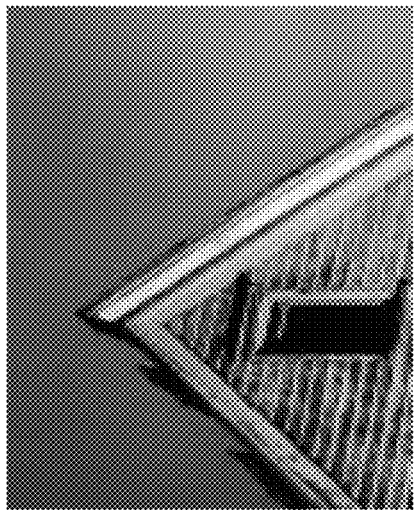
Figure 3:
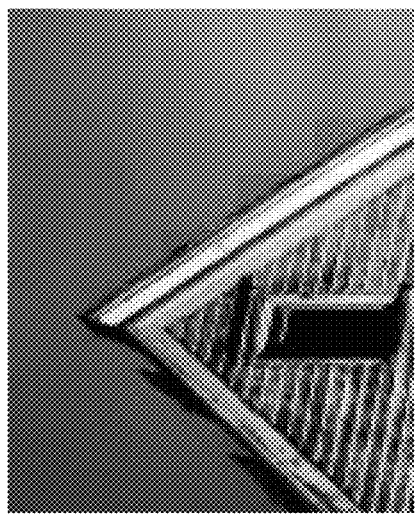
Figure 3:
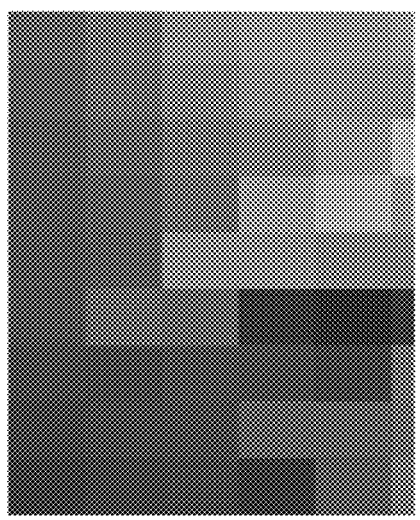

FIG. 3 shows four images: FIG. 3.1 represents a matrix I containing unmapped HDR data. FIG. 3.2 shows an image J derived from I using a routine as in [routine 01] where a full resolution matrix P was used. FIG. 3.3 shows an image J derived from I using a routine like routine 01, where P was used at a very low resolution. FIG. 3.4 shows an image J derived from I using a routine like routine 01 where all matrixes J, P, and I were kept at a low resolution.

As it can be seen by comparing FIG. 3.3 and FIG. 3.4, downsizing only P leads to much less loss in quality than downsizing all data I. Of course, FIG. 3.3 and FIG. 3.4 are exaggerated; in the real world, the blocking should be much less visible.

A method embodying this technique comprises starting a processing thread by calculating P at a very low resolution, and then allowing for fast display of the image, so that the user can see a result very quickly. When the thread is finished calculating P at a very low resolution, another thread can be started to calculate P at a finer resolution and so forth until P is calculated at a sufficiently high resolution. This allows for a conversion that is extremely responsive, where the user sees first results extremely quickly and where calculating the full resolution image will take place shortly later.

Flexible Tone Mappings

This can be extended to a system where the user can influence the tone mapping locally. Local adjustment of tone mapping is feasible using the invention disclosed since we have a system that allows for a speedy feedback of changes to the user via a quick preview.

Figure 4:
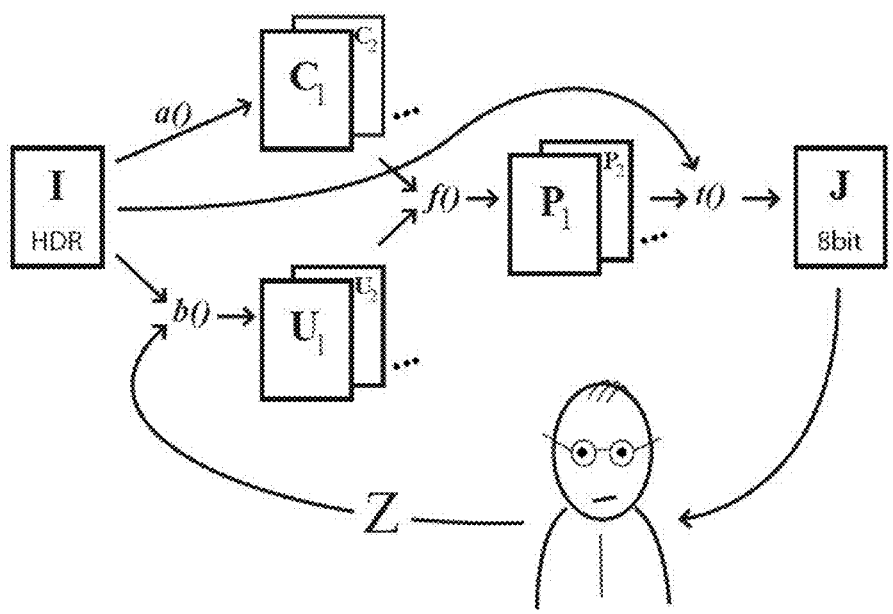
FIG. 4 shows an overview of one embodiment of the invention, featuring sets of matrixes C, U and P.

FIG. 4 shows an overview over such an enhanced workflow, featuring sets of matrixes C, U and P. Note that when we say P, we always refer to a set of matrices $P_1$, $P_2$, $P_3$ . . . , same for C and U. Each set of matrices can consist of one or more matrices.

In FIG. 4, I refers to the HDR data, C refers to data derived from the image I, such as a I convolved with a kernel, a calculated convolution kernel radius, wavelet coefficients, an edge-detection and the like. Z refers to data that the user has input. This can be for instance brush stroke information, such as

```
                  Z = [ radius = 19.3,
                        effect = −3,
                        (x1, y1) = (400, 300),
                        (x2, y2) = (420, 295),
                        (x3, y3) = (430, 305),
                        (x4, y4) = (415, 320),
                        (x5, y5) = (390, 340) ]
```

Note: The variable "effect" is described later in this disclosure. Please note also that depending on the implementation, the brush stroke receiving routine may be implemented in a way that produces a matrix of data instead of single brush stroke coordinates.

Also, please note that Z may contain other selective user input, such as a gradient effect, a "magic wand" selection connected with an effect, an IRP or an IRR (with reference to U.S. Pat. Nos. 7,031,547, 6,865,300, and 6,728,421, which are incorporated herein).

As it can be seen in FIG. 4, U (id est: $U_1$, $U_2$ . . . ) is derived both from Z and from I. This is one aspect of this invention. This is explained in the following sections. First, to define U: U is a matrix or matrices that contain adapted data based on a user input and adapted to the image, providing information to succeeding algorithms on what the user wants where to which intensity on a pixel-by-pixel-basis.

For instance, assume that in an image containing a sky a user has drawn a brush stroke extending from the top left to the top right. Then Z contains the brush stroke coordinates, I contains HDR data representing an image with said sky, and U could be calculated as follows:

```
                                                      [routine 02]
10    detect edges in I
20    define R = matrix of zeroes
30    set pixels at the coordinates provided in Z to 1.0 in R
40    find all pixels neighboring values of 1.0 in R, store those in R'
50    delete those pixels in R' corresponding to a detected edge of I (see
      line 10)
60    add remaining pixels in R' to R
70    if (R' = nil) goto 100
80    define R' = nil
90    go to 60
100   set U = j * R;
```

In other words, routine 02 finds a matrix of pixels U that contain a value of j for all those pixels in I (respectively J) where the user appears to desire a certain effect.

Note that the advantage in routine 02 is that the data Z are adapted to the image using HDR values of I. Remember that HDR values have a very high dynamic range. So for instance, imagine an image containing (a) shadows, (b) dark objects, (c) bright objects, (d) a bright sky, (e) white clouds, and (f) a light source. Then I will due to its nature show strong luminance differences between a and b, b and c, c and d, d and e and e and f. In a tone-mapped/compressed image J, these differences cannot be present to the same extent due to the nature of tone-compressed images. Therefore the data in I will be much more suitable to be used for an adaptive routine like routine 02 than any other non-HDR data, for instance because detail differences, colour differences and edges are a lot stronger in I.

Please note that parallel to routine 02, there are other techniques that can take user input and adapt/refine the area of user input based on the image data, such as the Smart Eraser tool in Photoshop®, IRP's described in U.S. Pat. Nos. 7,031,547, 6,865,300, and 6,728,421; IRR's described in "User Definable Image Reference Regions" U.S. application Ser. No. 11/832,599, incorporated herein; and "Self-Adaptive Brush for Digital Images" U.S. application Ser. No. 11/674,080, incorporated herein.

All of these adaptive routines will benefit in their selectivity if the reference image has a high differentiation of its details.

FIG. 4 further shows that the adapted data provided in U and the HDR-related data in C are merged to a matrix/matrices P. For instance, let us assume for now that the data in C contain a suggested luminosity adaptation factor, for instance so that:

$$J_{xy} = i * C_{xy} * I_{xy} \quad \text{[equation 06]}$$

would be a simple tone mapping, where i is any constant. This states simply that multiplying the pixels in I with the (scalar) factors in C yields in an adapted, tone-compressed version of J. The multiplication symbol "*" here refers to a scalar multiplication.

If for instance P=C+U, then we'd have:

$$J_{xy} = i * (C_{xy} * U_{xy}) * I_{xy} = J_{xy} = i * f(C_{xy} * U_{xy}) * I_{xy} = J_{xy} = i * P_{xy} * I_{xy} \quad \text{[equation 07]}$$

which means that P can be calculated by simply adding C and U, or in other words: the function $f$ is a simple addition. Note that more complex implementations of $f$ are possible and will be discussed later. Note that the tone mapping is here just a multiplication of I with a value in P. Speaking in imaging terms, this means that through input Z the user can provide (adapted) input to the system to further define where the brightness adaptation of the tone mapping should be increased or decreased to his or her desire.

Note that the effect of P need not be limited to brightness changes only, P (respectively $P_1$, $P_2$ . . . ) can also represent other parameter(s) of the tone mapping that are suitable to be separated from the process and stored in a matrix, the user may desire having influence over, or affect the visual appearance of the result. The process depicted in FIG. 4 is also shown in routine 03:

```
                                                    [routine 03]
10    Receive HDR image I, so that min(I)    0.0 and max(I)= 1.0
20    For each pixel (x,y) in C do:
30        Set C(x,y) to a(I,x,y)
40    Reserve memory for U
50    Set Z to nil
60    set U = b(I,Z)
70    Reserve memory for P
80    set P = f(C,U)
90    set J = t(I,P)
```

```
100    display J to user via a monitor
110    receive Z from user
120    go to 60
``` where:
I=HDR image
C=pre-analysis of I
a( )=analytical function, for instance kernel convolution
Z=user input
U=user input based matrix
b( )=function to calculate U out of Z and I
$f$( )=function to merge U and C into P
P=Parameter Matrix
t( )=function to calculate J out of P and I.
J=output image Note that I would typically be a 16 bit or 32 bit image. I can be derived from merging a variety of input images of different exposures into one image, or it can be simply a 8 bit, 12 bit or 16 bit image coming from a camera with a good dynamic range, which includes good digital cameras, scientific, or medical cameras.

The function a( ) can be a function that derives pre-calculated data from the HDR image I. For instance, if the herein disclosed implementation is based upon the algorithm suggested by [Ash02], $a_{xy,1}(I)$ can represent a suggested radius for each coordinate in I, or $a_{xy,2}(I)$ can represent the value obtained by convolving I at the coordinate (x,y) with a suitable kernel. Or, in a more general case, $a_{xy}(I)$ can provide a suggested brightness-adjustment value derived from the image I. Keep in mind that the luminosity component of all tone mapping routines can be brought to the form $J_{xy}=C_{xy}*I_{xy}$, where $C_{xy}$ is a brightness adjustment factor for the luminosity.

b( ) is a function that calculates U out of Z and I in a suitably fashion, and examples for how to do this were given in [routine 02] and in the section following routine 02.

$f$( ) is a function that combines U and C into P. Imagine that if P represents radii for all x,y for a convolution kernel to be used for the tone mapping in t( ) then C could contain radii of a convolution kernel suggested by an algorithm, and U could contain data where the user would wish a radius increase or decrease.

Terms as "brightness", "contrast", "halo-protection", "detail sensitivity", may be more user-friendly terms for internal parameters.

t( ) was already discussed, see equations 03, 04 and 05.

Figure 5:
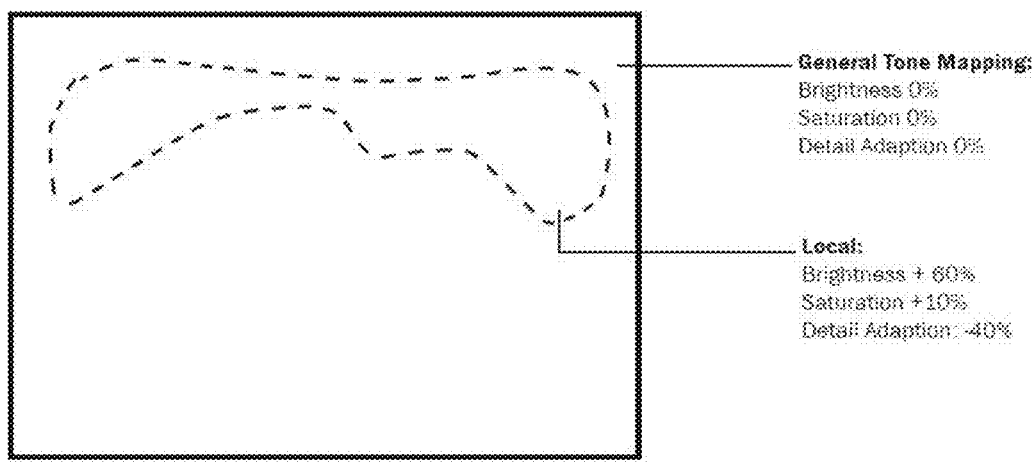
FIG. 5 represents in an abbreviated graphical form the desired HDR conversion details that the user might communicate to the disclosed system in a further embodiment. As shown, there are general HDR conversion parameters that the user may chose for the whole image, and there are local HDR conversion parameters provided to the system.

FIG. 5 represents in an abbreviated graphical form the desired HDR conversion details that the user may communicate to the disclosed system. As shown, there are general HDR conversion parameters that the user may chose for the whole image, and there are local HDR conversion parameters provided to the system.

Figure 6:
FIG. 6 displays a graphical user interface of how one embodiment of the invention can look like, featuring brushes with which the user can take influence on the HDR conversion parameters.

FIG. 6 displays a graphical user interface ("UI") of a system using one embodiment of the invention. As shown, it features brushes with which the user can influence the HDR conversion parameters.

Note that in the concept depicted in FIG. 6 the user has a radio button where he can select whether to edit the main tone mapping parameters or the tone mapping parameters of a currently selected region. Depending on the setting of that radio button the user can adjust the settings of that according area via the control sliders to the bottom right of the interface. Additionally the user is offered to use brushes to increase or decrease a certain effect.

Note that the selection line displays a region that the user has selected, the boundaries of which could be stored in Z. Also note that there is a striped area around the selected region, indicating the area of "image adaptation." In other words, Z represents only the selected region, while U represents an area as large as the striped area and the selected region together.

It is a design choice whether the effect of the brushes is supposed to override the adjustments that the user has made within a region or vice versa. In this case, for better handling, editing of certain parameters via brushes and editing of unrelated parameters via regions was allowed.

Figure 7:
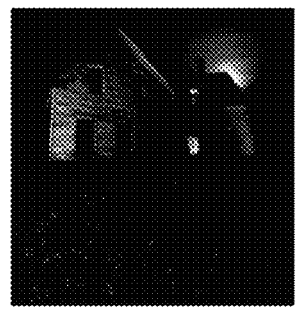
FIG. 7 displays different matrices.
Figure 7:
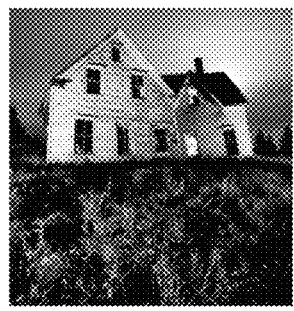
Figure 7:
Figure 7:
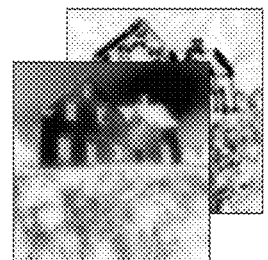
Figure 7:
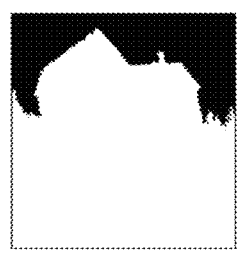
Figure 7:
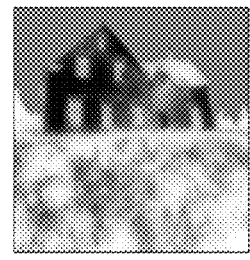

FIG. 7 displays different matrices. FIG. 7.1 represents a (un-mapped) HDR image, id est where no details were adapted to the dynamic range of a computer screen or printer. FIG. 7.2 shows an image as it could result from an HDR tone mapping process, and FIG. 7.3 shows such a tone-mapped image where the user has taken some selective control over the tone mapping process. Here, the user has desired to keep the sky dark while rendering the house bright. FIG. 7.4 represents two matrices as they may occur in C, FIG. 7.5 may represent the matrix U, and 7.6 may represent the matrix P.

As you can see, the user input represented in matrix U, FIG. 7.5, has influenced the matrix P. Note that the white pixels in FIG. 7.5 may represent "zero" or "nil" or "transparent", depending on how the function $f$ is designed. Those skilled in the art may know that many methods are possible to ensure that the areas in U where the user wishes to not influence the given results do not affect P. For instance, if $f$ follows the principle of P=C+U, then areas of no user influence can be represented with zeros. If values in U are meant to overwrite C, then U should have transparency data (an "alpha channel") ensuring that U does not overwrite C everywhere.

In general, any such tone mapping parameter that would in the end of the process be stored in P ($P_1$, $P_2$, . . . ) could refer to, e.g., the brightness of the resulting pixels in J, the contrast of the resulting pixels in J, the haloing strength in a region in J, the detail retention in a region in J, a color temperature adjustment of resulting pixels in J, a color brilliance adjustment of resulting pixels in J, a sharpness of resulting pixels in J, or a number representing which tone mapping algorithm is preferred in what area in J.

It will be evident to those skilled in the art that various implementations of Z, U and $f$ can be programmed that allow the user for instance to increase or to decrease any such parameter in an image region, or it can be forced to a fixed value.

As an example for now, let us focus on brightness changes. If a system is implemented as discussed in this disclosure, the user might initially see an image J as shown in FIG. 7.2. The user could then communicate to the system using for instance a pointing device such parameters Z that are suitable to communicate to the system that the user wishes a darker sky. Such a system could be for instance a brush engine, or an IRP system or an IRR system or a lasso-like selection or anything the like. Then this user input is converted into U, then U and C are merged into P, and P is used to display a new version J of the image on the screen, as shown in FIG. 7.3, allowing the user to either accept the result or to refine it further.

Additional Embodiments

1—More Parameters

In another embodiment, the user may not only be allowed to take influence over parameters that are necessarily required for tone mapping, but also other parameters such as color change, noise reduction, and unsharp mask sharpening, etc. If these parameters are also stored in P, the suggested system (for instance as shown in FIG. 4) can allow for both a tone-mapping and other local adjustments in a fashion where the user has influence over all important image parameters, and where the user has the benefit that selection precision is enhanced since the original HDR data can be used to automatically adapt user input to the image, for example, function b. If the HDR conversion function t that is supposed to be implemented does not provide support for additional color or detail changing parameters, such function can easily be constructed as $t=t_1 °t_2 \equiv t_i(t_2)$ where either $t_i$ or $t_2$ is the original tone mapping and the other is an image change function supporting additional color and detail changes.

2—Manually Assisted Registration

In another embodiment, I may not be a perfectly merged HDR image. It is common to create HDR images out of a series of images with different exposure, shot on a tripod. If this process was done poorly, or with a bad tripod, or without a tripod, the resulting image may show poor overlays in J. In such case the system provided herein may keep the HDR data as a series of 8 bit or 16 bit images (the original images) and only merge them by the time the function t is executed, overlaying them either using a so-called image registration technique, or allowing the user to overlay the images manually, or to first overlay the images using an image registration technique and to further allow the user to further register the images himself. In any case, it may be advisable to allow the user to provide registration input via Z, so that some matrixes $U_n$, $U_{n+1}$ . . . may contain spatial offset information used to adapt source images to one another to enhance the rendered image.

Figure 8:
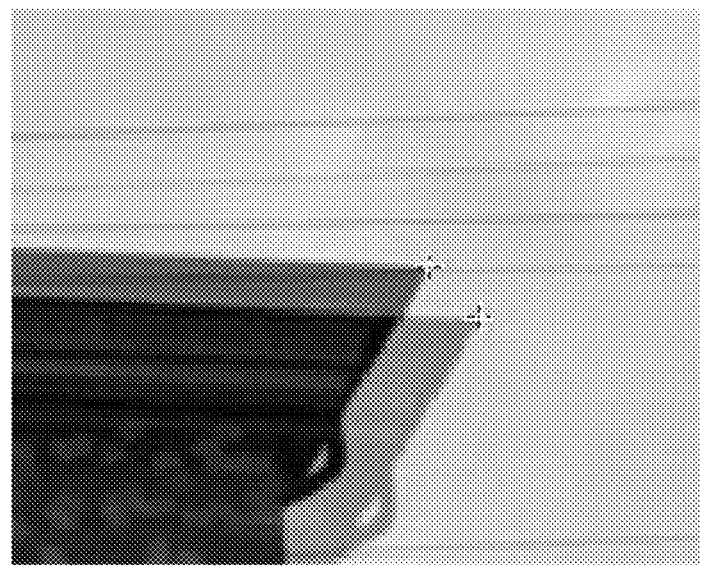
FIG. 8 shows how a poor image registration might not match two details, leading to some sort of "double vision" effect in J. Here the user can place two marks on the details to communicate to the system what objects need to be overlaid.

FIG. 8 shows how a poor image registration might not match two details, leading to some sort of "double vision" effect in J. Here the user can place two marks on the details to communicate to the system what objects need to be overlaid.

Note that the user may have difficulties in communicating to the system which detail of which source image he is referring to. Therefore, the system may not receive information from the user which of the two marks refers to which original image—which means that the two marks define the required correction vector, but the signature of this vector will be unknown. In this case, the correction vector should be used that leads locally to a better match, id est within a radius r≈10 . . . 30 pixels.

3—Manually Assisted Object Weights

In another embodiment, the scene may contain moving objects such as people or vehicles. If that is the case, the HDR data matrix I will contain details that do not entirely match. In this case, there is a benefit from a system where I is kept as individual images $I_1$, $I_2$ . . . and where they are merged into one image later in the process, which is when t is applied. As will be known to one of ordinary skill in the art, it is possible to register images, even if they have different brightnesses, so that it such functionality can be added into t.

Figure 9:
FIG. 9 illustrates a system where the user can take influence over image details.
Figure 9:
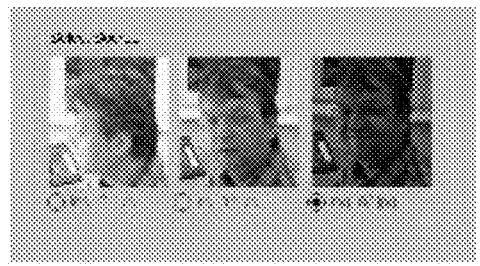
Figure 9:
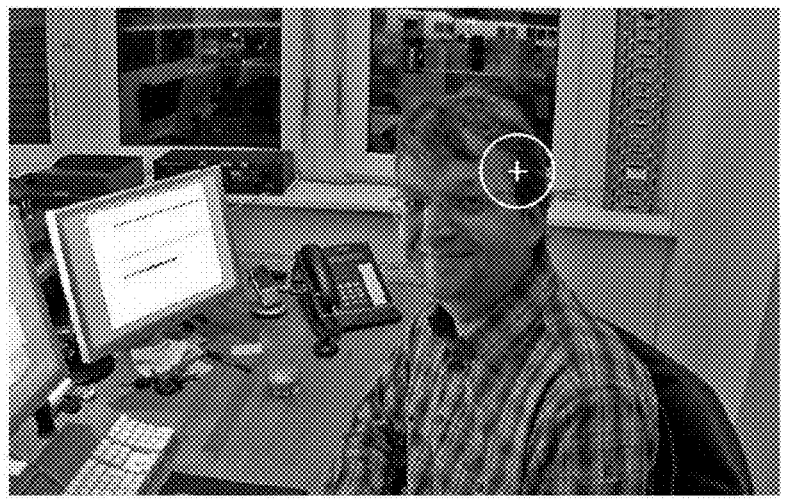

FIG. 9 illustrates a system where the user can take influence over image details. If the user spots an object that moved or changed while the series of images were being taken, the user may point in a system to that object with his pointing device cursor (see FIG. 9, 9.1), and the system can then analyse which two or more images $I_n$, $I_{n+1}$ . . . out of the series of original images $I_1$, $I_2$ . . . contributed to the detail in this area. Then a second user interface area can be shown to the user (9.2) where the user can select which of the images $I_n$, $I_{n+1}$ . . . contains the optimal detail. Once the user has provided this information, the system can allow the user to brush in the wanted detail (respectively: the "desired version" of a face/an object). This information can then be stored in U and be fed into function $f$, so that t can then render the final result, FIG. 9.3, based upon what detail the user wanted at the given location.

In order to build a system that supports the feature named above, the system needs to be able to assign weights $\omega_1$, $\omega_2$, . . . to the pixels in $I_1$, $I_2$ . . . . It is known in the art to implement weights as a function of the brightness of pixels in the images $I_1$, $I_2$ . . . , so that the extremely dark and bright pixels contribute less to the result. It would be possible to enable the user to further influence these weights in certain areas, so that certain elements of an individual source image $I_i$, do not contribute to the final result. With relation to FIG. 9, the user would select a preferred "face version", id est a preferred In, and then perform some brush strokes in the desired area. The algorithm would then set $\omega_n$ for that area to 1.0 and all other $\omega$ to zero. Of course, the system needs to ensure that no pixel exists that is assigned with zero weights in all $I_1$, $I_2$ . . . .

An image response function can be calculated as a function of $Z_{ij}$. It is feasible to calculate the image response function based upon only those $Z_{ij}$ the related weights of which were not influenced by the user. (With relation to FIG. 9, this means that the image response function is calculated based on the pixels that the user has not applied a brush stroke to, id est all pixels that don't belong to the face). The precision of calculation of such an image response function will benefit if the user excludes pixels via weights $\omega_1$, $\omega_2$, . . . belonging to objects that moved while the series of images was taken.

Note that the image response function can be calculated based on a subset of pixels of the image, and once the image response function is calculated, a 32 bit HDR image can be constructed from all given pixels and their assigned weights.

4—Maximizing the Image Area

Currently, it is common to create HDR shoots with a camera mounted onto a steady tripod. However, since image registration is a widely known technique in image processing, it is technically feasible to allow for HDR shooting without a tripod and with registering the images automatically. Registration means to calculate offsets between images based on their contents, so that images can be overlaid so that same image details match.

Figure 10:
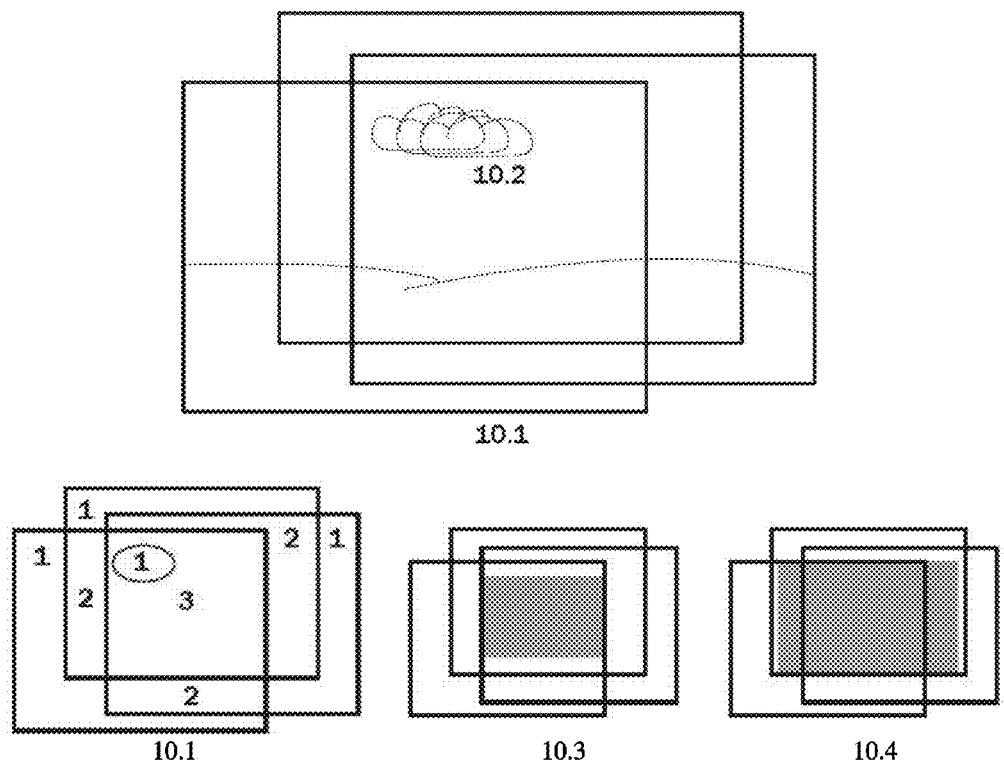
FIG. 10 shows a series of registered images, and the method of padding and weighting to maximize image area.

FIG. 10 shows a series of registered images. As can be seen, the user has shaken the camera significantly between the shots. As it can also be seen, a cloud has moved while the series of images was taken. FIG. 10.4 illustrates in its gray area the portion of pixels that can be kept. This is a considerably small area. FIG. 10.1 illustrates with numbers (1, 2, 3) how many pixels from $I_1$, $I_2$, $I_3$ are available to reconstruct the merged, tone-mapped image J at each location. If via the weighting system introduced above a HDR merging and tone mapping system is implemented that is capable of processing input images $I_1$, $I_2$ . . . that feature weights $\omega_n$=0 for certain pixels, the reconstructed image area can be larger than the area covered by all three images by assigning a weight to $\omega$=0.0 to nonexistent pixels. Essentially, the input images are padded so that they have the same dimensions after registration, and the pixels added during padding are assigned zero weight. As illustrated in FIG. 10.5, the image area may increase dramatically if the final image can be reconstructed from the area where pixels from only two out of three images were available. Many routines exist that are capable of registering images that were not only shifted, but also rotated and enlarged (zoomed) in relation to one another, so that the system shown herein works also if the user has rotated or moved the camera between the shoots or changed the zoom or moved his own position.

Figure 11:
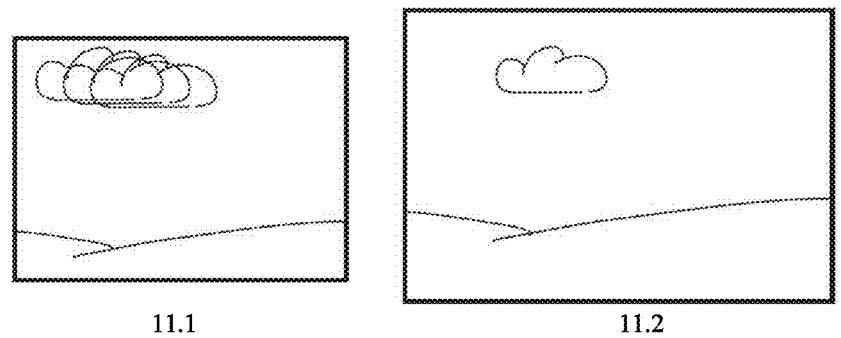
FIG. 11.1 shows how a result would look without the weighting system introduced in this disclosure, and 11.2 shows how the total image area can increase if said weighting system is implemented.

FIG. 11.1 shows what a result would look like without the padding and weighting system introduced herein, and FIG. 11.2 shows how the total image area can increase and how the cloud can benefit if said padding and weighting system is implemented. It is possible to combine the manual weighting with area maximization. Note the oval marked "1" in illustration 10.1, indicating that the user has assigned a weight of 1.0 to one of the images within that oval and weights of 0.0 to the other images, ensuring that no inferences of various clouds occur in the result. This relates to the feature depicted in FIG. 9.

5—Original Data Based Color Filters

In another embodiment, a color filter can be applied to the tone-mapped image J that receives as an input the corresponding brightness in the original scenario, id est in I. For instance, imagine an image taken within a room with low-temperature illumination of around 3000° K. The image also contains an outdoor scene seen through a window, illuminated by 6800° K. While fixing this solely based on a tone-mapped image J is possible using conventional adaptive color filters, it may be easier to apply a color correction filter to J as a function of values in I—id est before the tone mapping was applied. In other words: Color-correcting those pixels in J that relate to dark pixels in I, as opposed to color-correcting the pixels that are dark in J.

In other words, even after the tone mapping was applied and the image J is created, further image processing routines may benefit in their selectivity if the values of I are provided as input parameters for color filters, sharpness filters, or selectivity filters.

As an almost equal alternative, pre-processing of the images $I_1$, $I_2$, . . . is possible, which leads to the same effect. If the darkest image $I_1$ contains colors mainly illuminated with 3000° K, and if the brightest image $I_v$ contains colors mainly illuminated with 6800° K, the color temperature of all $I_v$, $1<=v<=V$, can be fixed as a function of v.

Note that for optimal results this colour change in $I_1$, $I_2$, . . . , $I_v$ should take place after an image response function has been calculated (to not introduce errors through the color correction), but before merging and tone-mapping the images $I_1$, $I_2$, . . . , $I_v$ into J.

6—Saving I and Z to Disk

Figure 12:
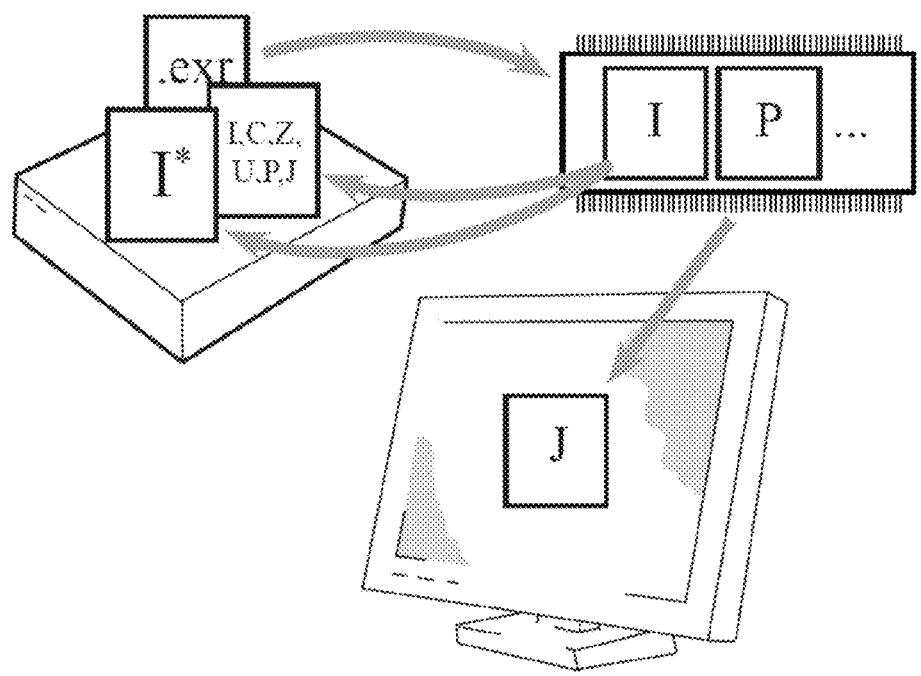
FIG. 12 illustrates a hard drive, a system memory, and a display device implementing one embodiment of the invention.

FIG. 12 illustrates a hard drive, a system memory, and a display device. It is illustrated that at the beginning of a retouching session of a user, there may be an ".exr" file on the hard drive which contains (by its very definition) HDR data, typically in 32 bit. Current systems allow the user to either modify the HDR data and save it back, or to tone-map the HDR data and save a JPG, TIFF or the like. In FIG. 12 it is illustrated that this invention disclosed herein allows for fast displaying of a tone-mapped image J on a screen to the user, while receiving refined tone-mapping related input from the user via Z, so that a process can save back I, U, C, Z, etc. to a file, as illustrated.

If, for instance, the system would allow the user to save back I, C, U, and Z (C and U possibly in low resolutions), the user would be able to open the file later, maybe even on a different computer, and see the edited on-screen-result J in fast time, while still working on the original HDR data I.

Alternatively, it may be sufficient to store I and Z on the hard drive, since the invention disclosed herein allows for calculating first results of J on the screen very quickly.

Alternatively, the system may store I and Z, plus any of the matrices U, I, P at whatever resolution they were present in memory by the time of saving data to the hard drive, or any lower resolution of U, I, P may be stored for saving hard drive space.

All features disclosed in the specification, and all the steps in any method or process disclosed, may be combined in any combination, except combinations where at least some of such features or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

This invention is not limited to particular hardware described herein, and any hardware presently existing or developed in the future that permits processing of digital images using the method disclosed can be used, including for example, a digital camera system.

A computer readable medium is provided having contents for causing a computer-based information handling system to perform the steps described herein.

The term memory block refers to any possible computer-related image storage structure known to those skilled in the art, including but not limited to RAM, Processor Cache, Hard Drive, or combinations of those, including dynamic memory structures.

Preferably, the methods and application program interface disclosed will be embodied in a computer program (not shown) either by coding in a high level language.

Any currently existing or future developed computer readable medium suitable for storing data can be used to store the programs embodying the afore-described interface, methods and algorithms, including, but not limited to hard drives, floppy disks, digital tape, flash cards, compact discs, and DVD's. The computer readable medium can comprise more than one device, such as two linked hard drives. This invention is not limited to the particular hardware used herein, and any hardware presently existing or developed in the future that permits image processing can be used.

Any currently existing or future developed computer readable medium suitable for storing data can be used, including, but not limited to hard drives, floppy disks, digital tape, flash cards, compact discs, and DVD's. The computer readable medium can comprise more than one device, such as two linked hard drives, in communication with the processor.

The invention claimed is:

1. A computer-implemented method to generate a high dynamic range image, the method comprising:
   receiving a plurality of images, each of the plurality of images having an image detail represented by a value with a characteristic having a value that represents the characteristic for the respective one of the plurality of images, wherein at least two of the images have a different value for the image detail characteristic;
   determining a parameter, wherein the parameter is determined based on the values of the characteristic image detail for the plurality of images;
   determining a response function based on the plurality of images;
   after determining the response function, generating a plurality of edited images by altering the value of the characteristic image detail for each of the plurality of images based on the parameter; and
   merging the plurality of edited images to construct a high dynamic range output image; and
   tone mapping the high dynamic range output image based, at least in part on the response function.

2. The computer-implemented method of claim 1, wherein the characteristic image detail is color temperature.

3. The computer-implemented method of claim 1, wherein the characteristic image detail is one of: brightness, contrast and sharpness.

4. The computer-implemented method of claim 1, wherein determining the parameter comprises determining a range of the values of the characteristic image detail for the plurality of images and further determining a representative value within the range, wherein the parameter is based on the representative value.

5. The computer-implemented method of claim 4, wherein the characteristic image detail is color temperature and wherein the range of the values includes a darkest color temperature value of at least one of the plurality of images and a lightest color temperature value of at least one of the plurality of images.

6. The computer-implemented method of claim 1, wherein determining the parameter includes receiving a user input of the parameter.

7. A non-transitory computer-readable medium storing instructions to generate a high dynamic range image that, when executed by one or more processors of a capture device, cause the one or more processors to:
   receive a plurality of images, each of the plurality of images having an image detail represented by a value with a characteristic having a value that represents the characteristic for the respective one of the plurality of images, wherein at least two of the images have a different value for the image detail characteristic;
   determine a parameter, wherein the parameter is determined based on the values of the characteristic image detail for the plurality of images;
   determine a response function based on the plurality of images;
   after determining the response function, generating a plurality of edited images by altering the value of the characteristic image detail for each of the plurality of images based on the parameter; and
   merge the plurality of edited images to construct a high dynamic range output image; and
   tone mapping the high dynamic range output image based, at least in part, on the response function.

8. The computer-readable medium of claim 7, wherein the characteristic image detail is color temperature.

9. The computer-readable medium of claim 7, wherein the characteristic image detail is one of: brightness, contrast and sharpness.

10. The computer-readable medium of claim 7, wherein determining the parameter comprises determining a range of the values of the characteristic image detail for the plurality of images and further determining a representative value within the range, wherein the parameter is based on the representative value.

11. The computer-readable medium of claim 10, wherein the characteristic image detail is color temperature and wherein the range of the values includes a darkest color temperature value of at least one of the plurality of images and a lightest color temperature value of at least one of the plurality of images.

12. The computer-readable medium of claim 7, wherein determining the parameter includes receiving a user input of the parameter.

13. A system to generate a high dynamic range image, the system comprising:

one or more processors; and a memory coupled to the one or more processors, the memory configured to store instructions that upon execution by the one or more processors cause the one or more processors to:

receiving a plurality of images, each of the plurality of images having an image detail represented by a value with a characteristic having a value that represents the characteristic for the respective one of the plurality of images, wherein at least two of the images have a different value for the image detail characteristic;

determine a parameter, wherein the parameter is determined based on the values of the characteristic image detail for the plurality of images;

determine a response function based on the plurality of images;

after determining the response function, generating a plurality of edited images by altering the value of the characteristic image detail for each of the plurality of images based on the parameter; and merge the plurality of edited images to construct a high dynamic range output image; and tone mapping the high dynamic range output image based, at least in part, on the response function.

14. The system of claim 13, wherein the characteristic image detail is color temperature.

15. The system of claim 13, wherein the characteristic image detail is one of: brightness, contrast and sharpness.

16. The system of claim 13, wherein determining the parameter comprises determining a range of the values of the characteristic image detail for the plurality of images and further determining a representative value within the range, wherein the parameter is based on the representative value.

17. The system of claim 16, wherein the characteristic image detail is color temperature and wherein the range of the values includes a darkest color temperature value of at least one of the plurality of images and a lightest color temperature value of at least one of the plurality of images.

* * * * *